A. H. NELLER.
GEAR MECHANISM.
APPLICATION FILED FEB. 28, 1916.

1,200,392.

Patented Oct. 3, 1916.
2 SHEETS—SHEET 1.

WITNESSES:

INVENTOR
Albert H. Neller
BY
William Louden
ATTORNEY

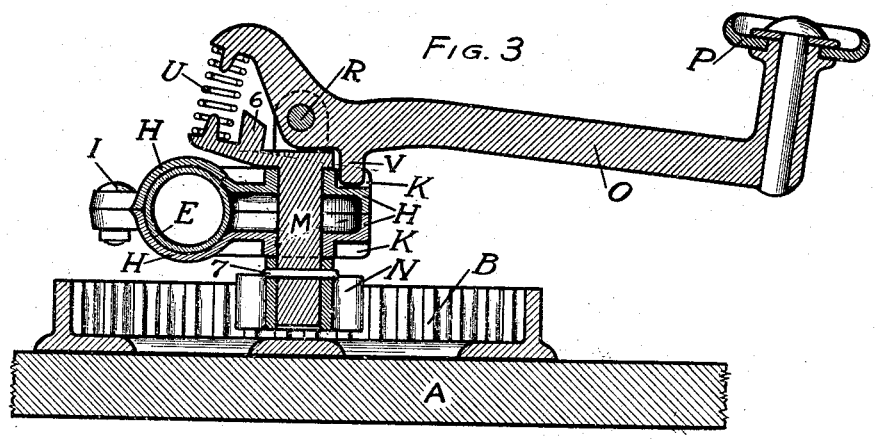
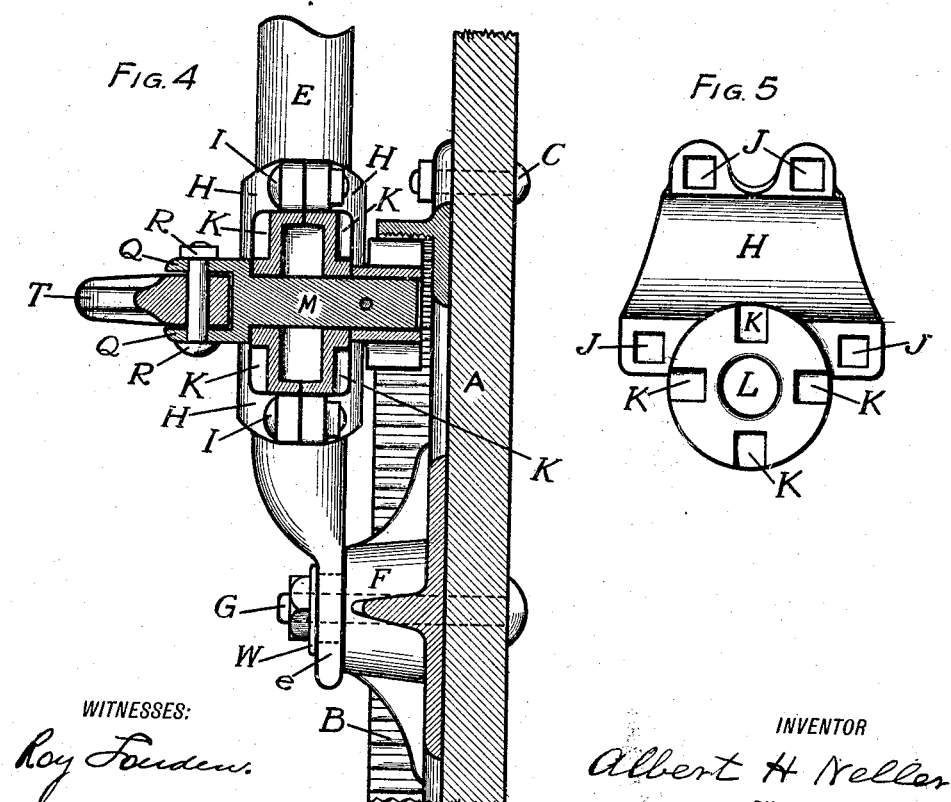

UNITED STATES PATENT OFFICE.

ALBERT H. NELLER, OF FAIRFIELD, IOWA, ASSIGNOR TO LOUDEN MACHINERY COMPANY, OF FAIRFIELD, IOWA, A CORPORATION OF IOWA.

GEAR MECHANISM.

1,200,392.    Specification of Letters Patent.    Patented Oct. 3, 1916.

Original application filed March 6, 1914, Serial No. 823,012. Divided and this application filed February 28, 1916. Serial No. 80,868.

*To all whom it may concern:*

Be it known that I, ALBERT H. NELLER, a citizen of the United States, residing at Fairfield, in the county of Jefferson and State of Iowa, have invented a new and useful Improvement in Gear Mechanism, of which the following is a specification.

My invention relates to gears designed to be manually rotated in either direction, to rotate or tilt a member connected therewith, and to hold said member in certain stationary position, and it consists of the features herein described and more definitely set out in the claims.

This application is a division of my application Serial No. 823,012, filed March 6, 1914.

Figure 1:
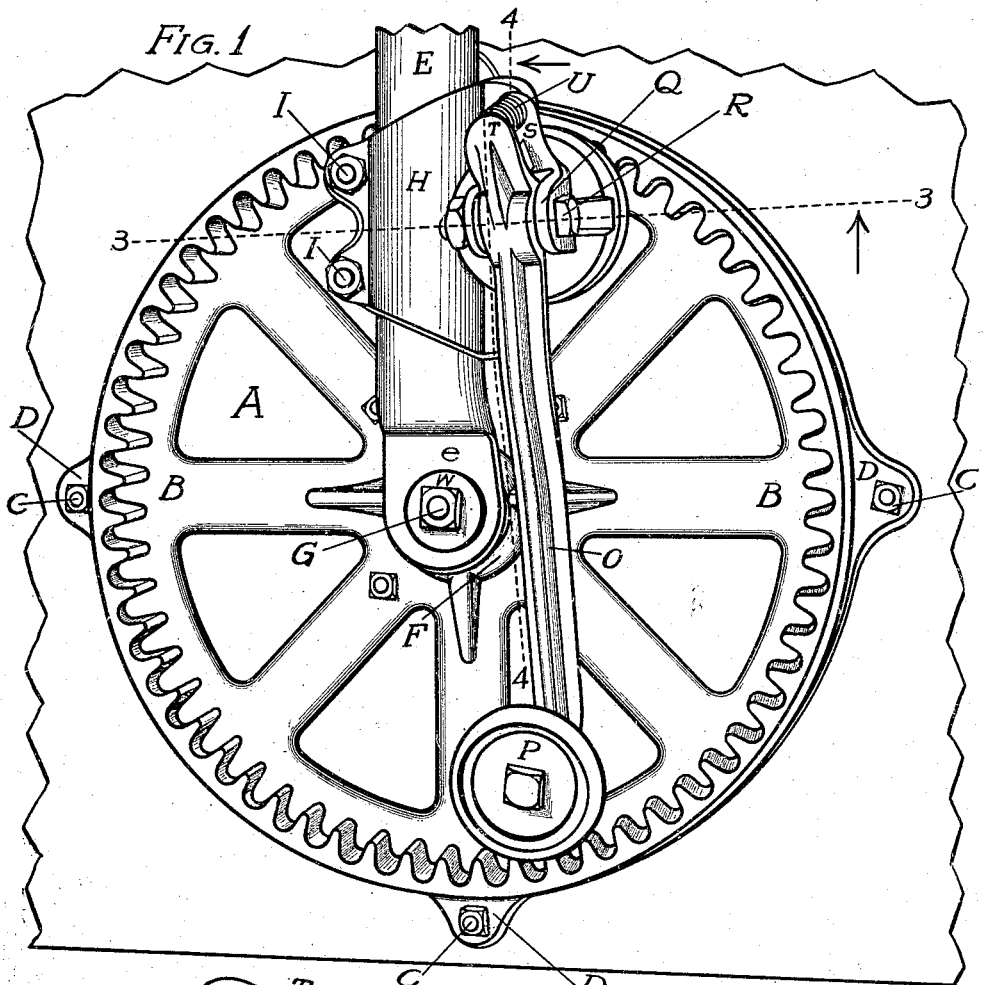
Figure 2:
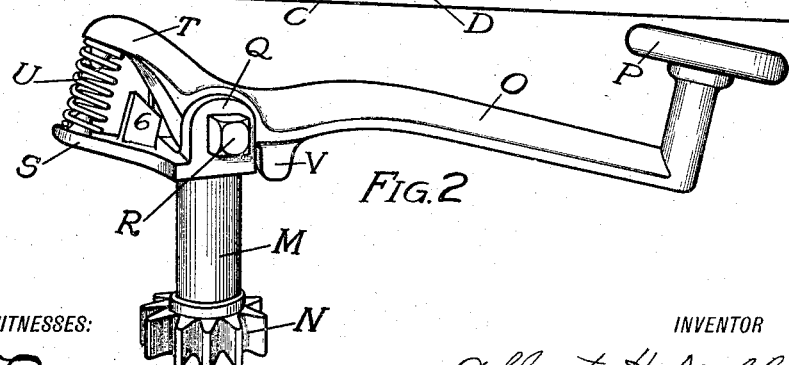

In the accompanying drawings Figure 1 is a perspective of a broken away portion of one side of a member to be rotated or tilted showing its supporting pivot and the rotating or tilting gear attached to the side of the member. Fig. 2 is a detached perspective of the operating crank with its shaft and pinion. Fig. 3 is a horizontal section on line 3—3 of Fig. 1, looking in the direction of the arrow, the operating crank being turned around at right angles to the position shown in Fig. 1 to bring it on this line. Fig. 4 is a vertical section on line 4—4 of Fig. 1, looking in the direction of the arrow, the crank being turned at right angles to the position shown in Fig. 1 to bring it at right angles with said line. Fig. 5 is a detail view.

Referring to the drawings, A represents a portion of one side of the rotatable member to which the gear B is attached, preferably by bolts C passed through the side of said member and through holes in lugs D. E represents a portion of a part having its lower end *e* flattened and secured to a pivot preferably on the hub F of the gear B, and held in place thereon by a bolt G and washer W so as to constitute a support for said member.

It will be understood by those skilled in the art that the other side or end of the member A will be pivotally supported, but this is not shown, because generally it is not necessary to place the tilting gear on both sides or ends of the receptacle.

A pair of clamping members H are secured to the support E within the diameter of the gear B by bolts I passed through the openings J, (see Fig. 5), the bolts on one side being shown in Fig. 1 and those on the other side being shown in Fig. 4. The members H are preferably made duplicates and are provided with pockets or recesses K, the use of which will be explained later on. The members H are also provided with a central opening L which forms a bearing for an axle M carrying a pinion N which meshes with the gear B. A crank O having a handle preferably fitted with a revoluble knob P is pivotally secured to the outer end of the axle M, whereby the turning of the crank will rotate the axle while the crank will have lateral movement thereon.

The outer end of the axle is preferably fitted with lugs Q between which the inner end of the crank is inserted and is held therein by a bolt R. The axle is further provided with a laterally projecting portion S, and the rear end of the crank with a corresponding portion T between which a compression coil spring is inserted. The crank is further provided with an inwardly projecting spur or lug V adapted to enter the pocket K which is opposite thereto, as the crank is rotated. The castings H being made alike, either one may be placed on the outside, and in case the pockets K on the outer casting should become worn the castings may be transferred from one side to the other.

The part E to which the members H are clamped being rigidly stationed, the turning of the crank and the resulting rotation of the axle M carrying the pinion N will cause the gear B to revolve, and this will cause the member A to tilt to the extent the axle is rotated. In turning the crank its outer end will have to be drawn away from the gear B to prevent the lug V from entering an adjacent pocket K and thus stopping its rotation. In this way the gear B may be rotated to any extent, and the member A will be rotated or tilted as much or as little as desired. To hold the member A stationary at any certain point all that is necessary is to let the spring U force the outer end of the crank inward, when the lug V will enter an adjacent pocket K, which will hold the gear stationary at that point.

It is preferable that the portion S be provided with a stop 6 to come in contact with the portion T, and thus prevent the crank from being drawn too far away from the gear; also, that the portions S and T be provided with inwardly projecting fingers, as shown, to hold the spring U securely in place. The pinion may be secured to the axle M in any suitable way, but a preferable way is shown in Fig. 3 in which a pin 7 is passed through the shaft and gear.

Only the portion of the member A to which the gear B is attached is shown in the drawings, because this is all that is necessary to enable those skilled in the art to understand the invention.

Any kind of a member A may be used, provided the gear B can be attached to one of its sides or ends, and it may be pivoted to any suitable support. The pivot may be secured to the hub of the gear as shown in the drawings, or the spokes shown may be omitted and the pivot may be separately connected to the member A, provided it is in the center of the gear and arranged so the pinion N will properly mesh with the gear B at all points in its circumference. It will be understood that the member A should be pivotally supported on the opposite side not shown in the drawings, but the rotating or tilting gear is required only on one side or end of the receptacle.

What I claim is:

1. In a device of the character described, a support, a member pivoted to the support and adapted to be rotated on its pivot, a gear secured to the member so its center will coincide with the pivot, a member having pockets in its face secured to the support, an axle journaled in said member centrally between said pockets, a pinion on the inner end of the axle adapted to mesh with the gear, a crank pivoted to the outer end of the axle whereby it will have lateral movement to and from said member while it will rotate the axle, an inwardly projecting lug on the crank adapted to catch in the pockets and hold the gear stationary at certain points, and means to hold said lug in contact with the pockets.

2. In a device of the character described, a rotatable member, a gear secured to said member, a support pivoted to the member in the center of the gear, a member having pockets in its outer face secured to the support, an axle journaled in said member centrally between said pockets, and carrying a pinion adapted to mesh with the gear, a crank pivoted to the outer end of the axle whereby it will have lateral movement to and from said member while it will rotate the axle, and an inwardly projecting lug adapted to catch in the pockets and hold the gear stationary at certain points.

3. In a device of the character described, a rotatable member, a gear secured to said member, and a support pivoted to the member in the center of the gear, a member having pockets in its outer face secured to the support, an axle journaled in said member centrally between said pockets, and carrying a pinion adapted to mesh with the gear, a crank pivoted to the outer end of the axle whereby it will have lateral movement to and from said member while it will rotate the axle, an inwardly projecting lug adapted to catch in the pockets and hold the gear stationary at certain points, and a spring to hold said lug in contact with the pockets.

4. In a device of the character described, a rotatable member pivotally mounted on a suitable support, a gear secured to one side of the member inside the support, a casting having pockets in its outer face secured to the support, an axle journaled in the casting and having its outer end forked, a pinion on the inner end of the axle meshing with the gear, a crank pivoted in the forked end of the axle and carrying a spur adapted to catch in the pockets of the casting, and a spring tensioned to move the crank on its pivot on the axle and to hold the spur normally in engagement with one of the pockets.

5. In a device of the character described, an axle having a lateral projection on its outer end provided with an outwardly projecting point said axle being journaled in a member having pockets in its outer face, a pinion secured to the inner end of the axle, a gear meshing with the pinion, a crank carrying a spur pivoted on the outer end of the axle so its inner end will be extended to correspond with the lateral projection on the axle, and having an inwardly projecting point to match the outwardly projecting point on the lateral extension of the axle, and a coiled compression spring inserted between the points whereby the spur on the crank will be normally held in engagement with one of said pockets.

6. In a device of the character described, a support, a member pivoted to the support and adapted to be rotated on its pivot, a member comprising a pair of castings clamped upon an adjacent part of the support, said castings having pockets in their outer faces, a shaft journaled in said member, a pinion secured to the inner end of the axle engaging a gear, a crank pivoted to the outer end of the axle and having an inwardly projecting spur adapted to catch in the pockets and a spring adapted to hold the crank so the spur will be normally in engagement with one of the pockets.

Fairfield, Iowa, February 26, 1916.

ALBERT H. NELLER.

Witnesses:
GERTRUDE K. FOWLER,
RUTH LARSON.